United States Patent
Trimmer et al.

(10) Patent No.: US 10,305,872 B2
(45) Date of Patent: May 28, 2019

(54) SYSTEM AND METHOD FOR KEY MANAGEMENT AND USER AUTHENTICATION

(71) Applicant: Interactive Intelligence Group, Inc., Indianapolis, IN (US)

(72) Inventors: Mark H. Trimmer, Greensboro, NC (US); Eric M Cohen, Henderson, NC (US); Kalpit Patel, Cary, NC (US); Jarrod S. Sexton, Morrisville, NC (US); Andres Silva, Greensboro, NC (US)

(*) Notice: Subject to any disclaimer, the term of this patent is extended or adjusted under 35 U.S.C. 154(b) by 280 days.

(21) Appl. No.: 15/230,004

(22) Filed: Aug. 5, 2016

(65) Prior Publication Data

US 2017/0041303 A1 Feb. 9, 2017

Related U.S. Application Data

(60) Provisional application No. 62/201,654, filed on Aug. 6, 2015, provisional application No. 62/201,702, filed on Aug. 6, 2015.

(51) Int. Cl.
*H04L 29/06* (2006.01)

(52) U.S. Cl.
CPC ........ *H04L 63/061* (2013.01); *H04L 63/0442* (2013.01); *H04L 63/08* (2013.01); *H04L 63/168* (2013.01)

(58) Field of Classification Search
CPC ... H04L 63/061; H04L 63/0442; H04L 63/08; H04L 63/168; H04L 63/0435
See application file for complete search history.

(56) References Cited

U.S. PATENT DOCUMENTS

2015/0271200 A1* 9/2015 Brady ................. H04L 63/1416
726/4

OTHER PUBLICATIONS

Amazon (2014). Amazon Elastic Compute Cloud User Guide, API Version 2014-06015 (Year: 2014).*

* cited by examiner

*Primary Examiner* — Brian F Shaw

(57) ABSTRACT

A system and method are presented for key management and user authentication. Secure SSH access may be performed through a public/private set of SSH keys where a user uploads a public SSH key to a key management application. The private SSH key remains with a device associated with a user. The public SSH key is distributed across multiple regions to instances and is region agnostic. Public SSH keys may be distributed and synchronized in a large cloud computing environment where public SSH keys associated with users may be added or removed in order to rebuild system security.

9 Claims, 4 Drawing Sheets

SYSTEM AND METHOD FOR KEY MANAGEMENT AND USER AUTHENTICATION

CROSS-REFERENCE TO RELATED APPLICATIONS

This application claims priority to U.S. provisional application 62/201,654 filed Aug. 6, 2015, entitled "SYSTEM AND METHOD FOR USER AUTHENTICATION" and to U.S. provisional application 62/201,702 filed Aug. 6, 2015 entitled "SYSTEM AND METHOD FOR KEY MANAGEMENT", the contents of which are incorporated herein.

BACKGROUND

The present invention generally relates to cloud computing systems and methods, as well as security of these systems. More particularly, the present invention pertains to the distribution and management of SSH keys for user authentication.

SUMMARY

A system and method are presented for key management and user authentication. Secure SSH access may be performed through a public/private set of SSH keys where a user uploads a public SSH key to a key management application. The private SSH key remains with a device associated with a user. The public SSH key is distributed across multiple regions to instances and is region agnostic. Public SSH keys may be distributed and synchronized in a large cloud computing environment where public SSH keys associated with users may be added or removed in order to rebuild system security.

In one embodiment, a method is presented for secure SSH access to instances in a cloud managed system using a key management system, wherein a user has a private key from which a public key has been generated and said private key is associated with a device associated with the user, the method comprising: uploading, by the user, the public key through a web front end secured by an identity management service, wherein the upload is region agnostic; writing the public key, by the key management system, to a database service table; distributing the public key automatically to instances using a common service; and accessing the instance using the user's public key.

In another embodiment, a method is presented for management of SSH public keys associated with a user, which have been distributed for user authentication instances, the method comprising: scanning a database service table located in a database service; determining whether the user should be present in the database service table based on a state of the database, wherein: if the user should be present, adding the user and the public key associated with the user; and if the user should not be present, removing the public key associated with the user.

In another embodiment, a method is presented for secure SSH access to instances in a cloud managed system using a key management system, wherein a user has a private key from which a public key has been generated and said private key is associated with a device associated with the user, the method comprising: uploading, by the user, the public key through a web front end secured by an identity management service, wherein the upload is region agnostic; writing the key, by the key management system, to a database service table; distributing the public key automatically to one or more instances using a common service; accessing, by the device associated with the user, the one or more instances using the user's private key, wherein the key management system compares the user's public key to the user's private key; and determining, by the key management system, if there is a match between the private key and the public key, wherein if there is a match, granting access to the user to the one or more instances, wherein if there is no match, denying access to the user.

DETAILED DESCRIPTION

Figure 1:
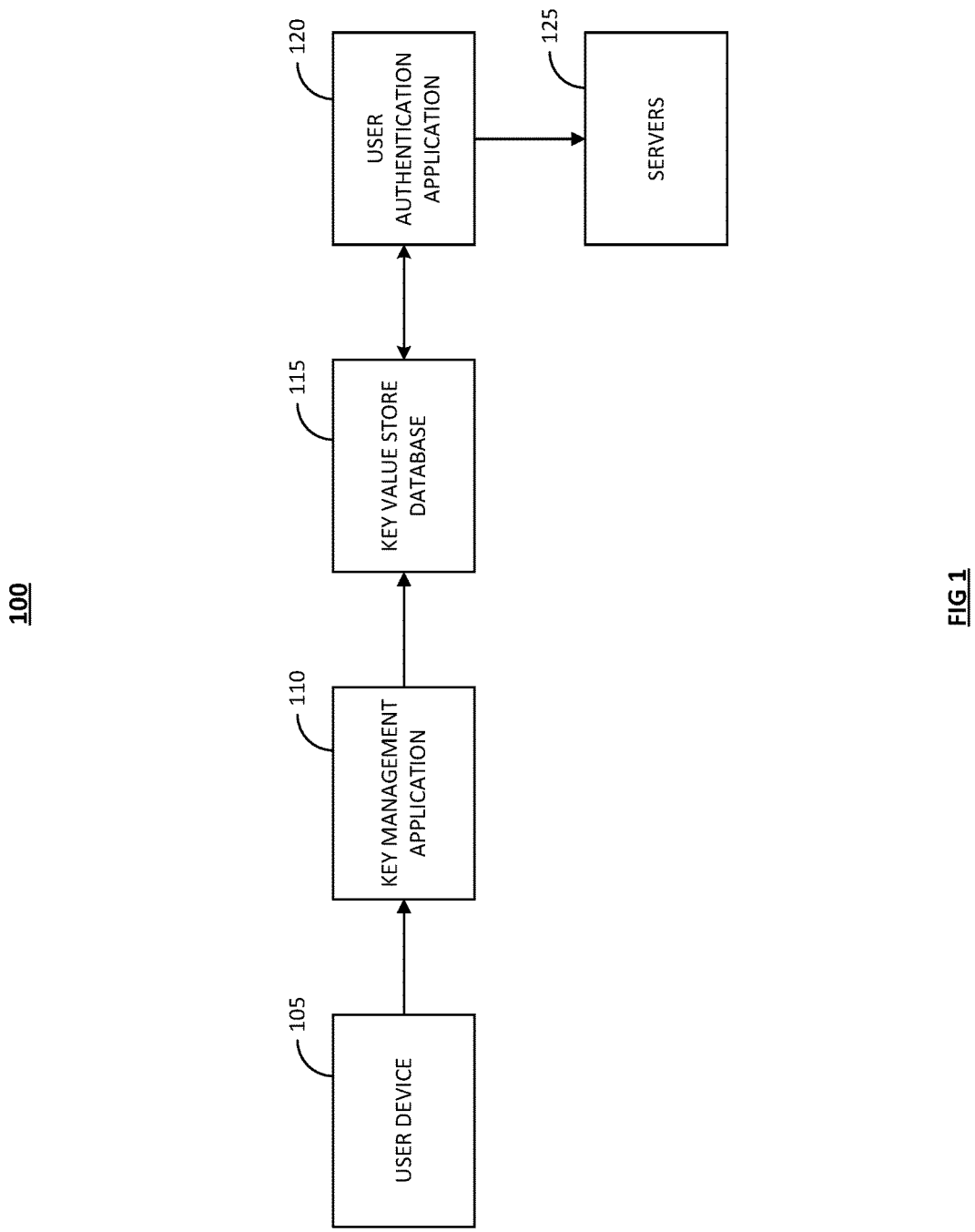
FIG. 1 is a diagram illustrating an embodiment of a system for key management and user authentication.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The distribution and management of secure shell (SSH) public keys in a cloud computing environment, particularly a large cloud computing environment, can be problematic. The environments may span many regions across the globe, which provides issues when synchronizing or maintaining the SSH public keys. The key management system, further described below is capable of being run in a single region while the keystore may be copied to the other regions to allow for the application of SSH keys without the key management system portal being run in every region. This scalability allows for users in other regions to access keys from other regions without adding more infrastructure.

FIG. 1 is a diagram illustrating an embodiment of a system for key management and user authentication, indicated generally at 100. The system 100 may comprise linked services where user access management is desired in a computing environment.

A user device 105 may be connected via a user interface and the network through which the SSH client is run. The user device 105 comprises a device associated with a user, such as a PC, a laptop, a tablet, a smartphone, etc. The SSH client comprises a software client which inputs information into the system 100. The key management application 110 is connected to the user device 105 through the user interface. The key management application 110 allows for a user to manage their SSH keys such as through the storage, distribution, and the replacement of the keys. The key management application 110 is also connected to a key value store 115, which comprises a database service (e.g. DynamoDB). The user authentication application 120 communicates with the key management application 110 via the key value store 115 in order to verify the user's identity using the combination of their public and private SSH keys. The user authentication application 120 applies the SSH key to the servers 125, as is further described below.

Key Management

In an embodiment, a system and method are presented for secure shell (SSH) access to a virtual server in the cloud, or an instance. An example of an instance might comprise Amazon Web Service's Elastic Compute Cloud (EC2) Linux instances. A web front-end secured by an identity management service (e.g., OneLogin) is provided, which allows users to upload their own SSH public keys.

SSH keys provide a secure means of logging into a server with SSH rather than using a password alone. While a password can eventually be deciphered, SSH keys are nearly impossible to decipher in a manner similar to breaking a password. Generating a key pair provides a user with two long strings of characters: a public key and a private key. The public key may be placed on any server connected to the cloud computing environment and unlocked by connecting to it with a client on a user device which already has the private SSH key. In an embodiment, the private SSH key is associated with a user device. When the two SSH keys are matched, the system unlocks without the need for a password. SSH keys may be generated locally by a user, may be unique, and may also have not been used twice in a row by a user or between different users of the system. In an embodiment, system security may be strengthened further by protecting the private key with a passphrase.

The public keys may be automatically distributed to the EC2 instances by a service running on all of the instances. Users are able to securely access the EC2 instances with their personal SSH key pair. In an embodiment, uploading and distribution of the public SSH key may be region agnostic, or multi-region. The key management application may be used in a single region and the keystore may be copied to the other regions on the backend, allowing for the application of the public SSH keys without having to run the key management application in every region. For example, the portal may only be run in the eastern part of the United States while SSH keys may be accessed from Australia without having to run a portal to the key management application.

An embodiment presented herein comprises a web application which interacts with main services such as an identity management service (e.g. OneLogin) or a database service (e.g. DynamoDB). Users are authenticated against the identity management service to provide secure access to web applications. Once a user is logged in to the key management application, they are presented with a web front end which allows them to configure and save their public SSH key. The public SSH key is saved into a database service table along with other information (e.g., username, date, status, etc.). Information in the database service table may be used by the user authentication service (further described below in FIG. 4).

In an embodiment, two environments may be present for the key management environment, such as a production environment and a lower environment. In the lower environments, for example, one key management application may cover all lower environments (e.g., DCA, TCA, stage, and INFRA). For the production environments, there is another key management application which covers all regions.

Figure 2:
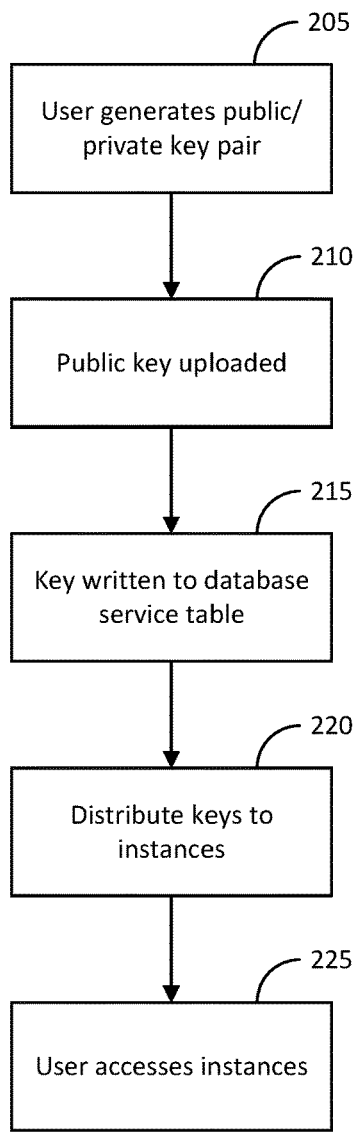
FIG. 2 is a flowchart illustrating a process for adding a key to the key management application.

FIG. 2 is a flowchart illustrating a process for adding a key to the key management application, indicated generally at 200. The process 200 occurs in the key management application 110 of FIG. 1.

In operation 205, a user generates a private/public SSH key pair. For example, a user may generate an SSH key pair on their user device or any other associated device with the user. Control is passed to operation 210 and the process 200 continues.

In operation 210, the user uploads their public SSH key to the key management application. For example, the user may insert and submit their public SSH key through a user interface (UI) in the key management application. A user may also be able to view their user details through the UI. Control is passed to operation 215 and the process 200 continues.

In operation 215, the user's public SSH key is written to a database service table. For example, the database service table comprises information such as user identification, the SSH key, the state of the SSH key, expiration of the SSH key, a fingerprint, when the most recent update occurred, any group assignments (e.g., administrator), and user state. A user state may comprise 'present', 'absent', or other state indicating whether a user is active. The database service table may be stored in a database service, such as DynamoDB. The key management system may write the SSH key to the database service table. Control is passed to operation 220 and the process 200 continues.

In operation 220, the public SSH key is distributed to instances. For example, the distribution of the public SSH key may be region agnostic, or multi-region. The key management application may be used in a single region and the keystore may be copied to the other regions on the backend, allowing for the application of the public SSH keys without having to run the key management application in every region. For example, the portal may only be run in the eastern part of the United States while SSH keys may be accessed from Australia without having to run a portal to the key management application. In an embodiment, when a user state is set to 'absent' in the database service table, the public SSH key may not be distributed. Distribution may be performed at system boot up, or at a specified time using a common service, such as that for user authentication described below in FIG. 4. In an embodiment, instances comprise EC2 Linux, or other Linux OS running either Python or Ansible modules. Control is passed to operation 225 and the process 200 continues.

In operation 225, the user accesses instances using their private/public SSH key pair. For example, the user may use the key management application to SSH into instances. Accessing, in an embodiment, comprises the user's private SSH key on their device being compared to the public SSH key. If the private and public SSH keys match, access is granted to the user. If they do not match, the user is denied access. Modifications may be made to the SSH configuration file such that the key location is updated to the user's private SSH key, which matches the public SSH key in the system. Usernames may also be synced with the application. The username and key location may also be updated for the host ranges. The connection between the user device and the instance may occur via an OpenVPN tunnel.

Figure 3:
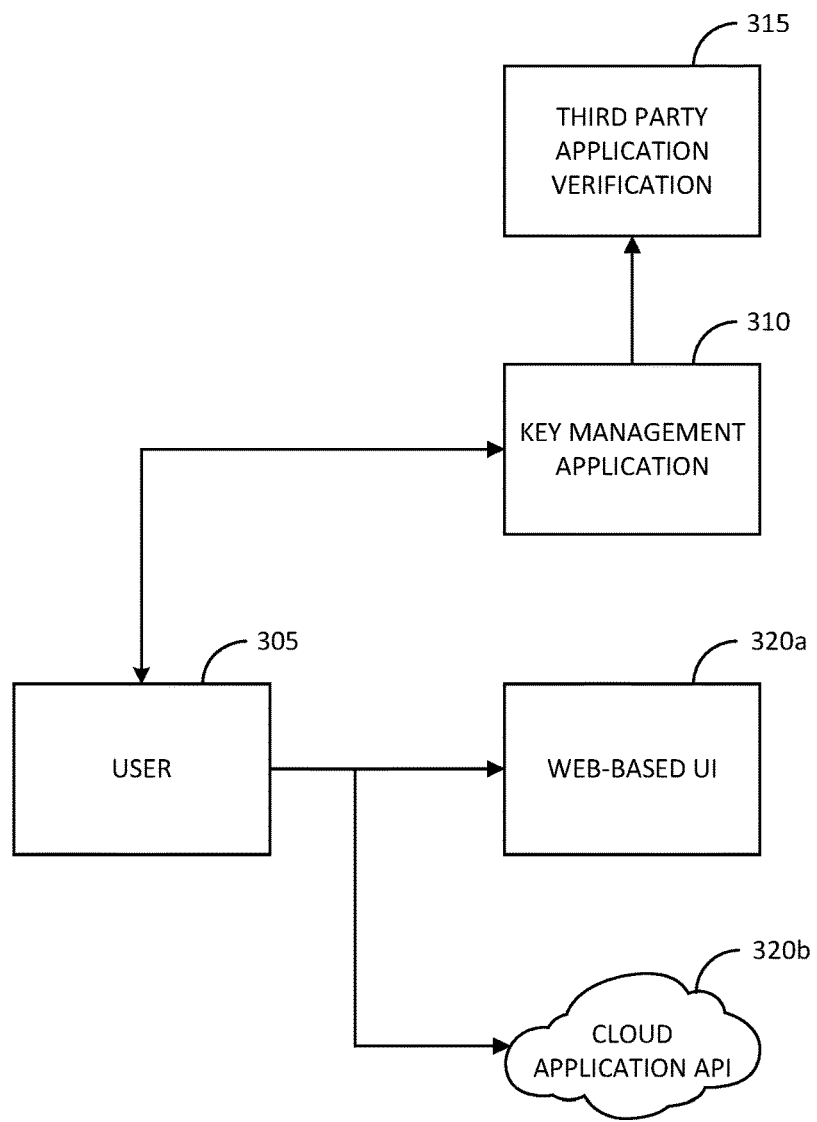
FIG. 3 is a flow diagram illustrating an embodiment of ephemeral access administration.

In an embodiment, the key management application may be used for ephemeral access, such as to production applications or other accounts. A temporary set of credentials may be generated which are usable for a period of time, such as up to an hour. After this period of time expires, the temporary set of credentials are no longer valid and the user will need to re-generate their credentials from the key management application. FIG. 3 is a flow diagram illustrating an embodiment of ephemeral access administration, indicated generally at 300.

A user 305 accesses the key management application 310, where the user 305 may generate their access request to a production system 320a and/or 320b. The ability of a user 305 to request their own access through the key management application 310 allows a user to request access automatically, without the need of an administrator manually granting access. However, in an embodiment, an administrator may be able to restrict whether users 305 can request access without manual intervention.

The key management application 310 may verify with a third party application or service, such as an incident resolution platform 315 (e.g., Pager Duty) as well as local configurations, which environments a user 305 has access to. The key management application 310 returns credentials to the user 305. The user 305 becomes an "enabled user" in the system, which means that the user 305 has been granted ephemeral access.

The user 305 is able to access the production systems 320a and 320b. Examples of production systems might comprise a web-based UI, such as AWS Console, or a Cloud application API, such as Amazon Web Services API.

User Authentication

SSH public keys may need distribution and management for user authentication to instances (e.g., Linux). Distribution and synchronization of SSH keys in a large cloud computing environment may be implemented on a multi-region basis where keys may be applied or assigned to a new user and removed when a user is inactive.

Figure 4:
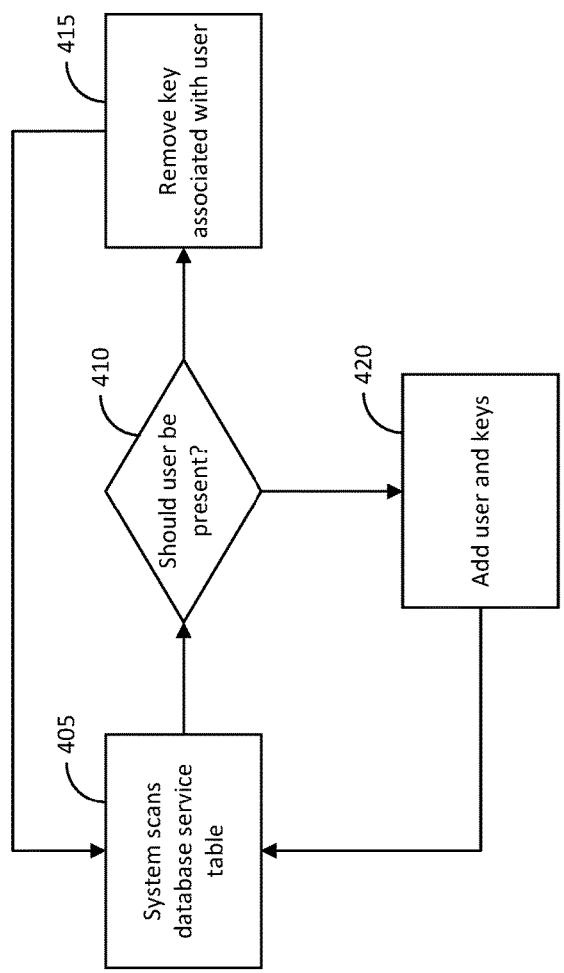
FIG. 4 is a flowchart illustrating an embodiment of a process for user authentication.

FIG. 4 is a flowchart illustrating an embodiment of a process for user authentication, indicated generally at 400. The process 400 occurs periodically, such as every 10 minutes, or at desired intervals to rebuild system security. The process 400 may occur in the user authentication application 120 (FIG. 1).

In operation 405, the database service table is scanned. For example, data is stored in the database service, such as DynamoDB. Each instance runs a cron job (using a program such as Ansible, for example) which periodically scans the database service table and provides updates to the table. The database service table comprises fields such as a username, ssh_key, and user state. In an example, the username field comprises information about the user, such as the name for the account. The ssh_key field comprises information about the public SSH key. Other fields may also be used as desired, such as to provide more enhanced features like key date and e-mail address. Fields may be edited manually or automatically. Scanning may be performed at specified time intervals (e.g., every 10 minutes). The state of the database may also be examined to determine if there have been changes. Any changes may be updated system-wide. Control is passed to operation 410 and the process 400 continues.

In operation 410, it is determined whether or not a user should be present in the database service table. If it is determined that a user should not be present, control is passed to operation 415 and the process 400 continues. If it is determined that a user should be present, control is passed to operation 420 and the process 400 continues.

In an embodiment, the database service may be polled for up-to-date SSH user data and a variable file created with the latest data. The determination may be performed by a playbook which provides support to manage the process through a series of iteration.

In operation 415, keys associated with a user are removed. For example, it has been determined that a user should not be present in the database service table. In an embodiment, the key may be removed on expiration (such as 90 days). A user may be provided with an alert and if the user does not update their key, the key is set to an 'inactive' state. The key may be removed and then the user will have to upload a new key. Control is passed back to operation 405 and the process 400 continues.

In operation 420, a user and associated keys are added to the database service table. For example, it has been determined that a user should be present in the database service table. A user is created and the SSH key associated with the user is added. In an embodiment, a key may also be assigned to an existing user or a key may be updated associated with an existing user. Control is passed back to operation 405 and the process 400 continues.

In an embodiment, the addition and removal of users in the user authentication system may be performed using a playbook, such as Ansible, which provides support to manage the process. The playbook may use the yml file created by python script (which polls the database) as a variable file. The playbook iterates through all of the items in the database service table in the variable files and examines user states. If a user has a state set to present, the user is created using the Ansible user module. The playbook iterates again over all users and adds their public SSH key. The playbook may iterate again over all of the users and if the user is set to absent, and if the user exists on the instance, their associated key is removed.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for management of SSH public keys associated with a user, which have been distributed for user authentication at instances, the method comprising:
   a. scanning a database service table located in a database service, the database service table storing a plurality of public keys associated with a plurality of users; and
   b. determining whether the user should be present in the database service table based on a state of the database, wherein:
      i. if the user should be present, adding the user and the public key associated with the user; and
      ii. if the user should not be present, removing the public key associated with the user, and
   wherein the public keys stored in the database service table are distributed to virtual server instances.

2. The method of claim 1, wherein the removing of the public key occurs automatically after a specified period of time has lapsed.

3. The method of claim 2, further comprising automatically setting the public key in the database service table to "inactive" prior to removal after the specified period of time has lapsed.

4. The method of claim 1, further comprising automatically assigning a key to an existing user.

5. The method of claim 1, further comprising updating a key associated with an existing user.

6. The method of claim 1, wherein the scanning is performed at specified time intervals.

7. The method of claim 1, wherein the scanning further comprises examining the database state for changes.

8. The method of claim 7, wherein the changes are updated system-wide.

9. The method of claim 1, wherein the determining is performed by a playbook which provides support to manage the process through a series of iterations.

* * * * *